No. 642,823. Patented Feb. 6, 1900.
J. K. LEARY.
MEANS FOR ATTACHING PNEUMATIC TIRES TO WHEELS.
(Application filed May 8, 1899.)
(No Model.) 2 Sheets—Sheet 1.
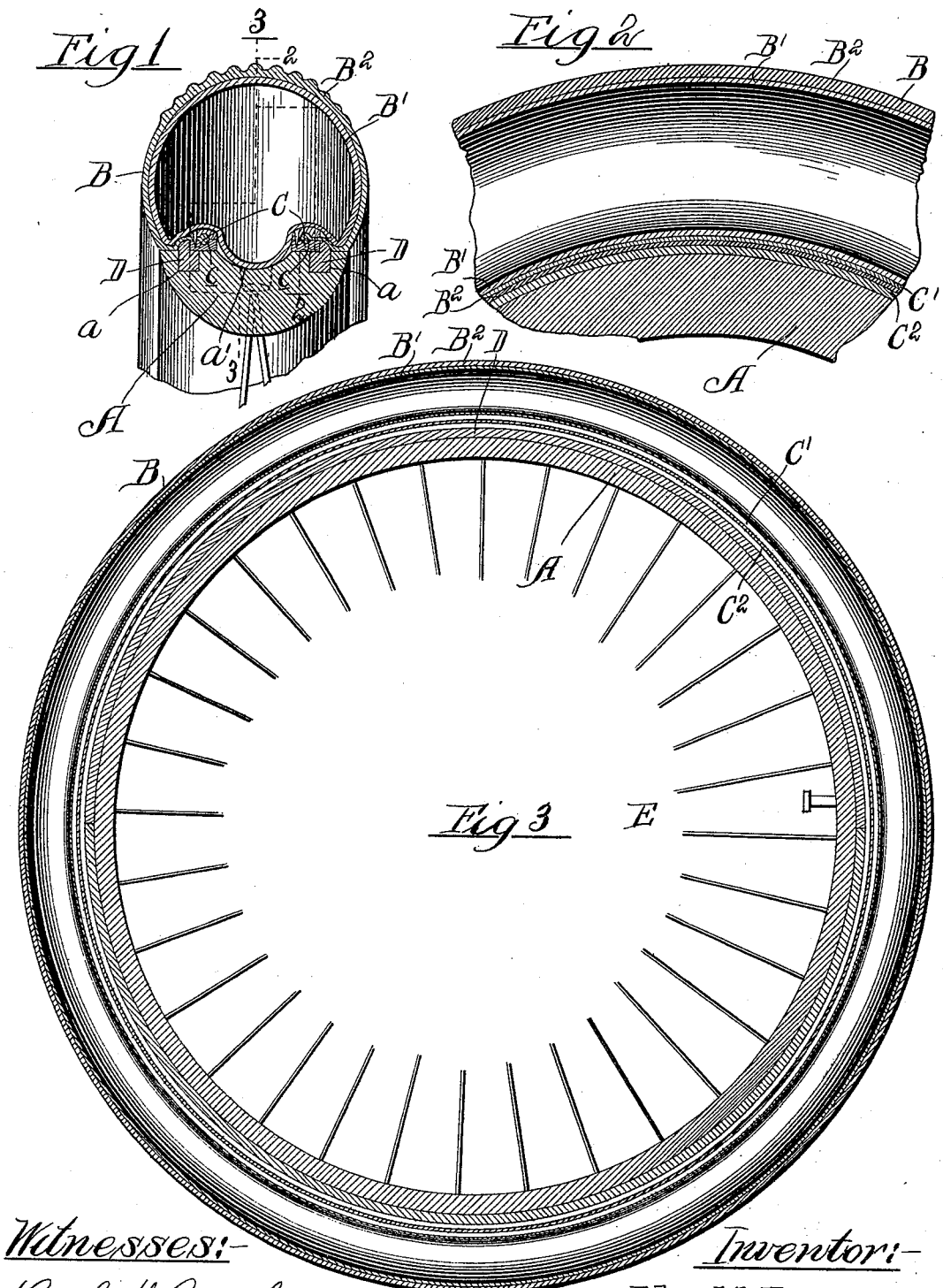
Witnesses:
Carl H. Crawford
William H. Hall
Inventor:
John K. Leary
by Poole & Brown his Attys No. 642,823. Patented Feb. 6, 1900.
J. K. LEARY.
MEANS FOR ATTACHING PNEUMATIC TIRES TO WHEELS.
(Application filed May 8, 1899.)
(No Model.) 2 Sheets—Sheet 2.
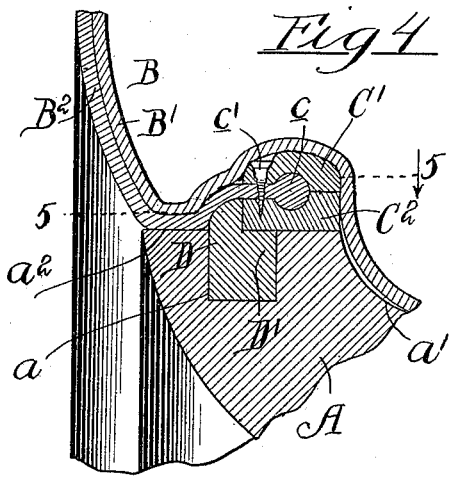
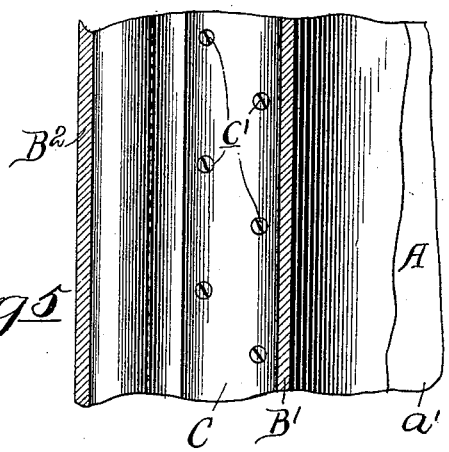
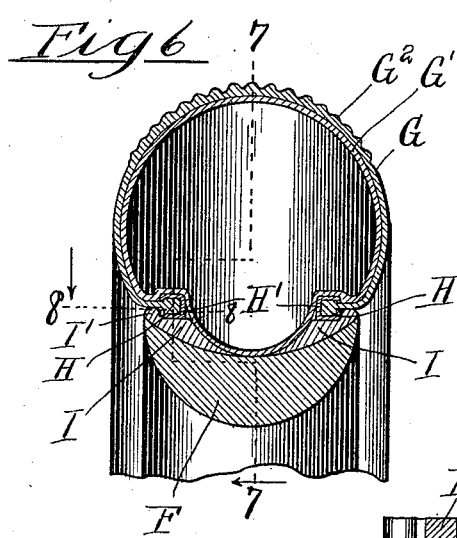
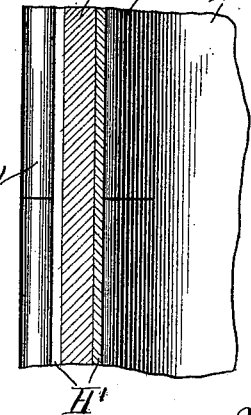
Witnesses:
Carl H. Crawford
William L. Hall
Inventor:—
John K. Leary
by Poole & Brown his Attys

UNITED STATES PATENT OFFICE.

JOHN K. LEARY, OF CHICAGO, ILLINOIS.

MEANS FOR ATTACHING PNEUMATIC TIRES TO WHEELS.

SPECIFICATION forming part of Letters Patent No. 642,823, dated February 6, 1900.

Application filed May 8, 1899. Serial No. 715,903. (No model.)

*To all whom it may concern:*

Be it known that I, JOHN K. LEARY, of Chicago, in the county of Cook and State of Illinois, have invented certain new and useful Improvements in Means for Attaching Pneumatic Tires to Vehicle-Wheels; and I do hereby declare that the following is a full, clear, and exact description thereof, reference being had to the accompanying drawings and to the letters of reference marked thereon, which form a part of this specification.

This invention embraces certain improvements in means for attaching to wheel-rims pneumatic tires of that class which consist of an inner inflatable and deflatable tube and an outer protecting covering or sheath which is adapted to be secured at its side margins to the wheel-rim.

The invention consists in the matters hereinafter set forth, and more particularly pointed out in the appended claims.

In the drawings, Figure 1 is a cross-section taken through a wheel-rim and an attached tire, showing my invention applied thereto. Figs. 2 and 3 are sectional views taken on lines 2 2 and 3 3 of Fig. 1. Fig. 4 is an enlarged detail view of some of the parts shown in Fig. 1. Fig. 5 is a plan section of the parts shown in Fig. 4, taken on line 5 5 of said figure. Fig. 6 is a view similar to that shown in Fig. 1, illustrating a modification of the invention. Figs. 7 and 8 are sectional views taken on lines 7 7 and 8 8 of Fig. 6.

In said drawings, A designates a wheel-rim, and B designates as a whole a pneumatic tire attached thereto, said tire consisting of an inner inflatable tube B' and an outer protecting-covering $B^2$. Said inner tube is made continuous and is provided with a suitable air-valve E, through which it may be inflated. The outer tube does not completely surround said inner tube, but only the portion thereof which is radially outside of the rim, and said outer tube is attached at its margins to the opposite sides of the rim.

Referring now to the means for detachably securing the margins of the outer covering of the tire to the wheel-rim, which means constitute the principal feature of my invention, these parts are made as follows: The side margins of the outer covering $B^2$ of the tire are provided with circumferential enlargements or rings C, which are made of relatively stiff and inextensible or inelastic material. Said circumferential enlargements or rings are adapted to be engaged when the tire is in place and inflated by means of suitable keys or stops D, removably secured in the outer face or tread of the rim, said parts being so constructed that when said keys are engaged with the rings and the tire inflated said keys serve to firmly lock the tire to the rim so long as the tire remains inflated, but may be readily removed when the tire is deflated to permit the removal of the tire or exposure of the inner tube for the purpose of repair and the like. Said rings C on the margins of the cover $B^2$ each consists, as shown in Figs. 1 to 5, of two layers or strips $C'$ $C^2$, which are made of relatively stiff material—such as wood, metal, or fiber—said layers being arranged one inside the other and the margin of the cover being clamped between the same. In order to hold the margins of said cover securely between said strips and prevent the latter from being disconnected therefrom under the strain coming on the covering, said margins are enlarged, as shown at $c$, which enlarged portion when the rings $C'$ $C^2$ are clamped thereon occupy oppositely-located recesses in the inner faces of said rings. Said inner and outer layers may be united in any suitable manner to hold the same on the margins of the cover and are shown as united by means of countersunk screws $c'$, some of which pass through the margins of the cover and serve as additional means of attaching said cover to said rings. In order to facilitate the attachment of said layers to the cover, one of the layers on each side of the rim may be, if desired, made of two parts, or may be made from a strip of suitable material lapped or scarfed at its meeting ends. The ring formed by said layers $C'$ $C^2$ is made of such internal diameter as to fit closely upon the outer face or tread of the rim, which latter, as shown in Figs. 1 to 5, inclusive, is provided on opposite sides of its longitudinal center with flat surfaces $a^2$ for engagement with said inner surface of the ring. Said rim is preferably provided between its sides with a circumferential depression $a'$, adapted to receive the heads of the spokes or nipples thereon. The keys or stops D, which engage said ring C and lock the tire in place, consist of curved strips or rings, which are located in annular recesses or depressions $a$, located in the flat portions of the outer surface or tread of the rim. Said stops or keys project radially outward from the rim and said projecting portions fit outside of and engage the laterally outer faces of the rings C of the covering when the tire is inflated, and thereby prevents the margins of said covering from being moved laterally outward. As a further improvement said keys are provided with laterally inward extensions D, which are flush in their outer faces with the flattened portions of the rim and overlap the rings C on their inner sides adjacent to the rim, as clearly shown in Fig. 4. With this construction said rings prevent the keys D from being accidentally moved radially out of their recesses or depressions when said tire is inflated. Said keys or stops D are each shown as being made of two semicircular parts, whereby they may be readily removed from the recesses which they occupy in the rim and inserted thereinto when not engaged by said rings. This feature of my invention is of much importance, as it forms in effect an automatic locking device by which the keys are securely held in position when the tire is inflated and obviates the necessity of employing separate and independent attaching means for said keys.

In Figs. 1 and 4 the parts are shown in the positions which they occupy when the tire is inflated. From an inspection of said figures it will be seen that the pressure of the air within the tire acts to force the outer faces of the rings C into close engagement with the keys D, which latter serve to limit the outward movement of the margins of said cover and lock the cover firmly in place. Said rings are also radially opposite to the projections of the stops or keys and serve to prevent said keys from moving out of their seats. When it is desired to remove the tire, said tire is first deflated, at which time either of the rings C of the cover may be moved toward the longitudinal center of the rim and out of line with the extensions D' of the keys D, so that the said keys may be lifted out of the annular recesses $a'$ occupied thereby. The margin of the tire will then be free to be moved laterally out of engagement with the rim, so that access may be had to the inner tube B' for the purpose of inspection and repair. Both sets of keys D may be removed, if desired; but in practice only one side of the margin of the cover $B^2$ need be released. Obviously the keys D need not be made to extend continuously around the rim, but will serve the purpose of holding the margins of the covering in place if a plurality of circumferentially-separated stops be employed, as the rings C are of such rigidity as to permit of such construction without liability of the parts of said rings between the keys getting out of correct position. The continuous form of the stops or keys, however, is preferable, owing to the fact that when in place there is no possibility of shifting circumferentially, and are consequently more effective in their action.

In Figs. 6, 7, and 8 is shown a modification of my invention which is adapted more especially for use in connection with a rim having on its outer surface or tread the usual annular concave depression which serves as a seat for a tire of common construction. In said figures, F designates a wheel-rim provided with a circumferential concave depression $f$, and G a tire consisting of any inner tube G' and an outer covering $G^2$. Said cover $G^2$ is provided on its margins with circumferential enlargements or rings H, which are adapted to have interfitting and interlocking engagement with keys I, attached to the outer surface or tread of the rim. Said rings H in the instance shown are each made by enlarging the margins thereof and surrounding the same by a suitable metallic or other annular casing H' to give the required rigidity thereto, which is preferably made of sheet metal and bent around the enlarged or thickened edges of the cover. The keys or stops I consist of annular parts or rings which surround and fit closely upon the outer surface or tread of the rim and each of which is provided in its outer margin with an annular radial flange I', adapted to engage the outer face of the adjacent ring H of the covering $G^2$. Said rings or stops are convexly curved, and their inner surfaces conform to the concave curvature of the rim F and are made of considerable width, so as to cover the larger portion of the outer surface of said tire, and constitute a part of the bearing-surface or seat for the inner tubes of the tire. Said keys, as in the previously-described construction, will be made of two or more parts, whereby they may be readily removed from the tire when desired. The parts shown in Fig. 6 are in the positions which they occupy when the tire is inflated. The pressure within the tire acts, as in the former construction, to force the rings outwardly against the flanges on the keys I, which latter limit the lateral movement of said margin of the cover and lock the same firmly in place. The keys I, while having no engagement with angular parts on the rim, as in the case of the previously-described construction, are prevented from moving laterally away from said rim when the tire is inflated, owing to the curvature of the meeting faces of the keys and rim and to the radial inward pressure exerted by the tire on said keys.

An attaching device made in accordance with my invention serves to readily lock the tire to the rim and absolutely insures against the accidental detachment thereof while the tire is inflated. Such construction also affords a ready means of detaching the tire from the rim, it only being necessary to deflate the tire, when the margins of the shoulders may be moved inwardly away from the keys or stops, which are released laterally, so that they may be readily removed from the rim, at which time the released margin of the rim may be moved outwardly and the inner tube made accessible for repair. Obviously the outer or side margins of the rim will be no larger in diameter than the inner diameter of the rings which are attached to the edges of the tire cover or sheath.

I claim—

1. The combination of a wheel-rim, a pneumatic tire comprising an inner tube and an outer cover, a ring on the margin of said cover, and a removable key projecting radially from the rim adapted to engage said ring on the tire, the outer cover of the tire, when inflated, engaging the rim laterally outside of the key and radially inside the outer margin of said key.

2. The combination of a wheel-rim, a pneumatic tire comprising an inner tube and an outer cover, said cover being provided at its margin with a ring which is adapted to pass over the rim, and a removable key which has interfitting connection with the outer or tread surface of said rim and is adapted for engagement with the laterally outer face of said ring, said key being located a distance inside the side margin of the tread-surface of the rim, thereby providing a bearing-surface laterally outside of the key which is engaged by the outer cover when the tire is inflated.

3. The combination with a wheel-rim, a pneumatic tire comprising an inner tube and an outer cover, a ring made of a rigid non-extensible material which is removably secured to the margin of said cover and a removable, circumferential key which projects radially from and has interfitting engagement with the outer or tread surface of said rim and is adapted for engagement with the lateral outer face of said ring.

4. The combination of a wheel-rim, a pneumatic tire comprising an inner tube and an outer cover, a ring on the margin of said cover, comprising inner and outer layers between which the outer margin of the cover is clamped and a movable stop or stops projecting radially from the rim and adapted to engage the outer lateral face of said ring.

In testimony that I claim the foregoing as my invention I affix my signature, in presence of two witnesses, this 15th day of April, A. D. 1899.

JOHN K. LEARY.

Witnesses:
 CHARLES W. HILLS,
 GERTRUDE BOYCE.